United States Patent [19]

Thompson

[11] Patent Number: 4,547,950
[45] Date of Patent: Oct. 22, 1985

[54] METHOD OF SPACING THE FOLDS OF A FOLDED FILTER MEDIA

[75] Inventor: Maynard L. Thompson, Prior Lake, Minn.

[73] Assignee: Honeywell Inc., Minneapolis, Minn.

[21] Appl. No.: 617,058

[22] Filed: May 29, 1984

[51] Int. Cl.⁴ .............................................. B23P 9/00
[52] U.S. Cl. ...................................... 29/445; 55/499; 55/521
[58] Field of Search ................................. 55/497–499, 55/296, 521; 29/163.5 F, 468, 445; 15/39, 104.5; 223/35; 264/286, 287; 493/406, 417; 132/11 R; D28/21

[56] References Cited

U.S. PATENT DOCUMENTS

| | | | |
|---|---|---|---|
| 2,058,669 | 10/1936 | Dollinger | 55/499 |
| 2,145,445 | 1/1939 | Hogg | 15/104.5 |
| 3,138,443 | 6/1964 | Engle et al. | 53/459 |
| 4,177,050 | 12/1979 | Culbert et al. | 55/499 |

FOREIGN PATENT DOCUMENTS 851247 10/1960 United Kingdom ............. 210/493.1

Primary Examiner—Bernard Nozick
Attorney, Agent, or Firm—Mitchell J. Halista; Trevor B. Joike

[57] ABSTRACT

The method for spacing the folds of a folded filter media assembly includes the steps of separating the folds of the filter media by the use of the tapered assembly comb having uniformly spaced teeth and subsequently inserting a rigid divider into the separated and spaced media folds to produce a uniformly spaced filter media. The comb can be discarded after the divider is inserted, and, accordingly, the comb is made of an inexpensive material having a desired degree of rigidity for handling, e.g., cardboard. The uniformly spaced filter media assembly is inserted into an operative position for filtering, e.g., as an air filter.

5 Claims, 2 Drawing Figures

AIR FLOW

METHOD OF SPACING THE FOLDS OF A FOLDED FILTER MEDIA

BACKGROUND OF THE INVENTION

Field of the Invention

The present invention is directed to filters. More specifically, the present invention is directed to a method for spacing the folds of a pleated filter media and an apparatus.

SUMMARY OF THE INVENTION

An object of the present invention is to provide an improved method for spacing the folds of a pleated filter media and an apparatus utilizing the same.

In accomplishing this and other objects, there has been provided, in accordance with the present invention, a method for spacing the folds of a pleated filter media including the steps of inserting a tapered comb having teeth spaced apart the desired distance of the folds in a filter media into the folds of a pleated filter media with each tooth of the comb being located in a respective groove between adjacent folds of the media and subsequently inserting a rigid divider into the spaced apart folds of the filter media and a filter apparatus comprising a peripheral filter enclosure, a folded filter media loosely retained in said enclosure, and a tapered comb for uniformly spacing the folds of said folded filter media.

BRIEF DESCRIPTION OF THE DRAWING

A better understanding of the present invention may be had when the following detailed description is read in connection with the accompanying drawings, in which.

DESCRIPTION OF THE PREFERRED EMBODIMENT

Figure 1:
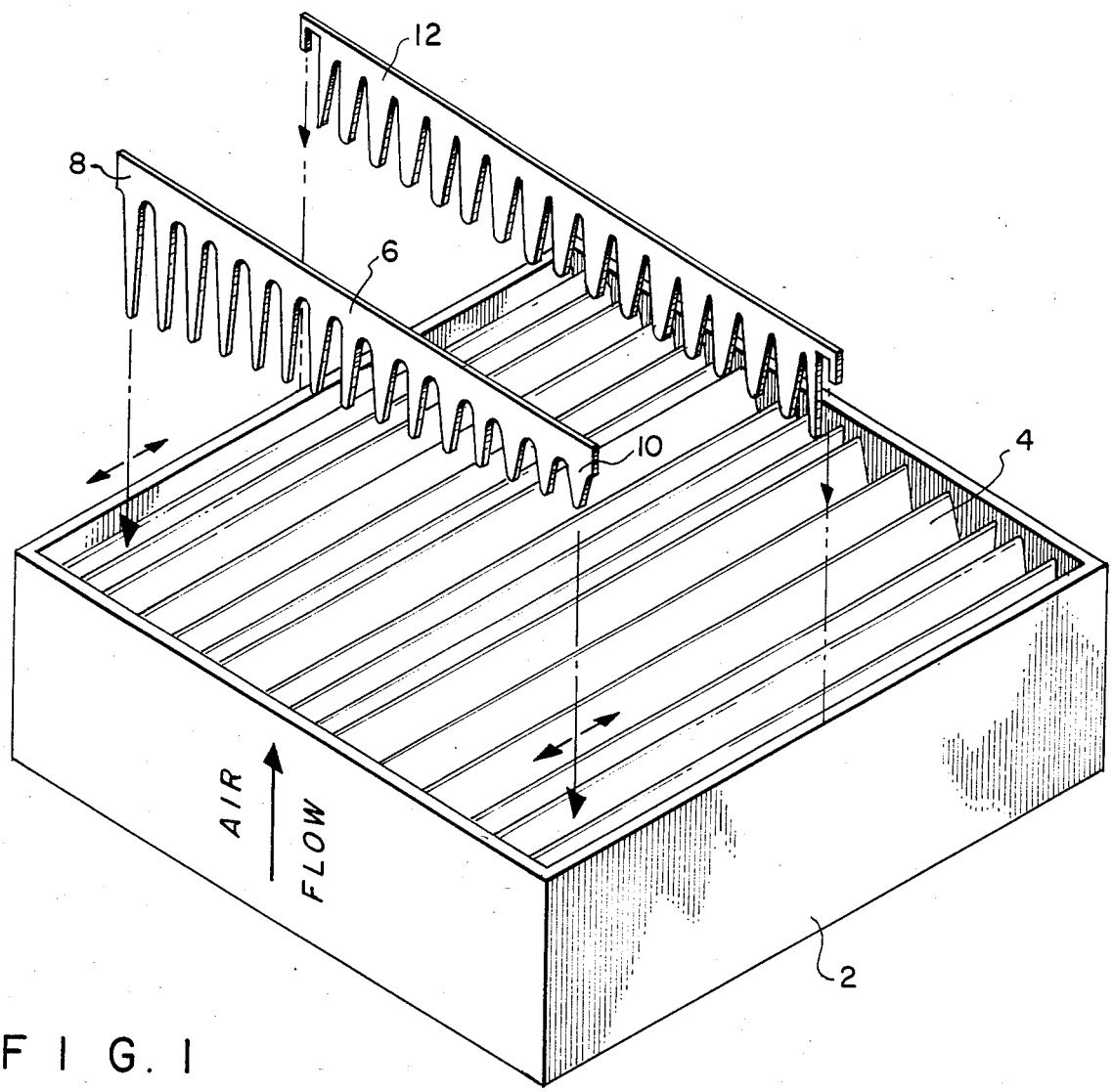
FIG. 1 is a pictorial illustration of the filter media assembly illustrating the method of the present invention and an apparatus utilizing the same and FIG. 2 is a cross-sectional illustration of an assembled filter media apparatus after utilizing the method of the present invention.
Figure 2:
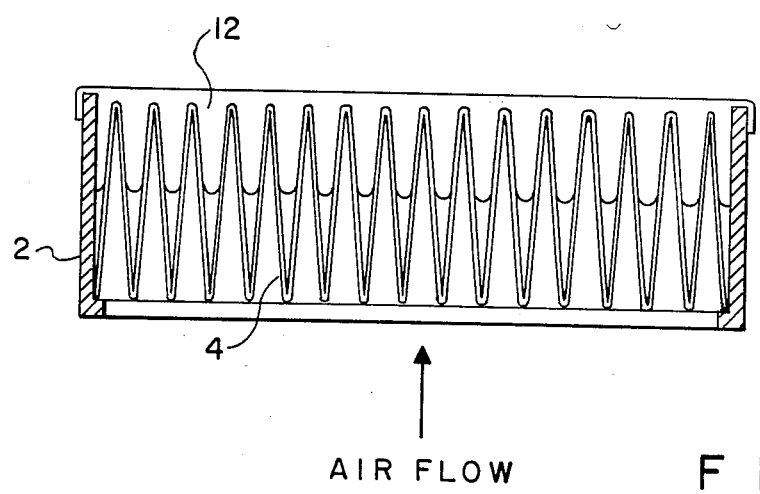

Referring to FIG. 1 in more detail, there is shown a filter media assembly having a peripheral enclosure 2 in the form of a rectangular frame with open ends. The filter media is in the form of a pleated or folded cartridge 4 extending side-to-side across the enclosure 2. The cartridge 4 is located loosely within the frame 2 with unsecured edges. The media 4 has normally irregularly spaced folds prior to the application of the spacing method of the present invention, i.e., the filter media 4 is conventionally supplied to a compressed state to minimize shipping volume and cost.

The method of the present invention includes the steps of utilizing a tapered comb 6 having uniformly spaced teeth tapering from a first comb end having a maximum tooth depth 8 to a minimum tooth depth end 10 at the other comb end. The comb 6 is used by inserting the maximum depth end 8 into the first fold and then utilizing the tapered comb structure to sequentially insert each of the teeth of the comb 6 between adjacent folds of the media 4. Finally, when the entire comb is inserted into the media 4, it is swept side to side within the enclosure 2 to uniformly space the media pleats. Subsequently, a rigid divider 12 having a plurality of similar teeth spaced the same as the teeth of the comb 6 is inserted into the media 4 to uniformly and rigidly space the pleats. The comb 6 may, then, either be withdrawn from the media 4 and discarded or retained in the media 4 to provide an additional spacing constraint for the folds of the media 4. As a disposable element, the comb 6 may advantageously be made of an inexpensive material having sufficient rigidity to be utilized in the fold spacing operation, e.g., cardboard. The filter assembly is then inserted into the position to be used for filtering an air flow, e.g., in an air cleaner.

Accordingly, it may be seen that there has been provided, in accordance with the present invention, an improved method for uniformly spacing the pleats in a pleated filter media and an apparatus utilizing the same.

The embodiments of the present invention in which an exclusive property or privilege is claimed are defined as follows:

1. A method for spacing the folds of a pleated filter media loosely retained in a peripheral filter enclosure including the steps of progressively inserting a tapered comb having teeth with a tooth depth uniformly varying from a maximum tooth depth at one end of the comb to a minimum tooth depth at the other end of the comb with the teeth being spaced apart the desired distance of the folds in the filter media into the folds of the pleated filter media with each tooth of the comb being located in a respective groove between adjacent folds of the media and subsequently sweeping the tapered comb side-to-side across the filter media to space apart the folds of the filter media within the enclosure.

2. A method as set forth in claim 1 wherein the teeth in the comb are uniformly spaced and equal in number to the number of folds in the filter media to uniformly space the folds of the filter media.

3. A method as set forth in claim 1 wherein the step of inserting the comb includes the step of initially inserting the end of the comb having the greatest tooth depth and proceeding to the end of the comb having a minimum tooth depth.

4. A method as set forth in claim 1 and including the further steps of subsequently inserting a toothed rigid divider having teeth equal in number and spacing to the teeth in the tapered comb into the spaced apart folds of the filter media with each tooth of the rigid divider being located in a respective groove between adjacent folds of the media and withdrawing the tapered comb from the filter media after the divider is inserted into the filter media folds.

5. A method as set forth in claim 1 and including the further steps of subsequently inserting a toothed rigid divider having teeth equal in number and spacing to the teeth in the tapered comb into the spaced apart folds of the filter media with each tooth of the rigid divider being located in a respective groove between adjacent folds of the media and retaining the tapered comb in the folds of the filter media after the divider is inserted into the filter media folds.

* * * * *